(12) United States Patent
Aoki

(10) Patent No.: US 7,129,936 B2
(45) Date of Patent: Oct. 31, 2006

(54) DISPLAY UNIT AND ELECTRONIC DEVICE INCLUDING THE SAME

(75) Inventor: Shigeki Aoki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 350 days.

(21) Appl. No.: 10/676,149

(22) Filed: Oct. 2, 2003

(65) Prior Publication Data
US 2004/0066382 A1 Apr. 8, 2004

Related U.S. Application Data

(62) Division of application No. 09/634,876, filed on Aug. 7, 2000, now Pat. No. 6,657,648.

(30) Foreign Application Priority Data
Aug. 12, 1999 (JP) ................................. 11-228389

(51) Int. Cl.
*G09G 5/00* (2006.01)
(52) U.S. Cl. .................. 345/204; 345/1.1; 345/3.4; 345/904
(58) Field of Classification Search .......... 345/1.1–1.3, 345/3.1–3.4, 204, 904
See application file for complete search history.

(56) References Cited

U.S. PATENT DOCUMENTS

| | | | |
|---|---|---|---|
| 5,081,687 A | 1/1992 | Henley et al. ................. 345/87 |
| 5,363,122 A | 11/1994 | Suenaga et al. ............. 345/212 |
| 5,440,339 A | 8/1995 | Harrison et al. ............. 348/177 |
| 5,546,098 A | 8/1996 | Moriconi ....................... 345/3 |
| 5,565,897 A | 10/1996 | Kikinis et al. ................. 345/13 |
| 5,570,108 A | 10/1996 | McLaughlin et al. ........ 345/741 |
| 5,579,025 A * | 11/1996 | Itoh ............................. 345/3.2 |
| 5,670,969 A * | 9/1997 | Yamagami et al. .......... 345/3.1 |
| 5,699,076 A | 12/1997 | Tomiyasu |
| 5,977,934 A * | 11/1999 | Wada et al. .................. 345/3.1 |
| 6,218,201 B1 | 4/2001 | Plangger et al. ............. 324/532 |
| 6,348,904 B1 | 2/2002 | Arai et al. ..................... 345/10 |
| 6,583,771 B1* | 6/2003 | Furuhashi et al. ............ 345/1.1 |

FOREIGN PATENT DOCUMENTS

JP        A-04-276792        10/1992

(Continued)

OTHER PUBLICATIONS

Erhart et al., "P-9: LCD Drivers with Built-In-Self-Test," SID 93 DIGEST, May 16, 1993, pp. 479-482.

(Continued)

*Primary Examiner*—Richard Hjerpe
*Assistant Examiner*—Duc Dinh
(74) *Attorney, Agent, or Firm*—Oliff & Berridge, PLC

(57) ABSTRACT

A display unit of which inspection process to inspect a connector for faulty connection can be automated. The display unit comprises a display section, a display driver IC among a plurality of types of display driver ICs capable of driving and controlling the display section, and an MPU sending a command and display data to the display driver IC. The display driver IC comprises an ID setting circuit and a command decoder decoding the command from the MPU. The MPU reads an ID information so as to control the display driver IC among a plurality of types of display driver ICs according to the corresponding control contents in the storage section among the plurality of types of control contents for a plurality of types of display driver ICs.

5 Claims, 14 Drawing Sheets

FOREIGN PATENT DOCUMENTS

| | | |
|---|---|---|
| JP | A-07-146665 | 6/1995 |
| JP | A-07-160215 | 6/1995 |
| JP | A-07-260857 | 10/1995 |
| JP | A-08-223514 | 8/1996 |
| JP | A-10-048357 | 2/1998 |
| JP | A-10-124016 | 5/1998 |
| JP | A-10-268834 | 10/1998 |
| JP | 10-323154 | * 11/1998 |
| JP | A-10-312172 | 11/1998 |

OTHER PUBLICATIONS

"Liquid Crystal Display having Internal Video Signals Generator for Self-Diagnostics," IBM Technical Disclosure Bulletin, vol. 38, No. 08, Aug. 1995, pp. 549-550.

European Search Report.

* cited by examiner

DISPLAY UNIT AND ELECTRONIC DEVICE INCLUDING THE SAME

This is a Division of application Ser. No. 09/634,876 filed Aug. 7, 2000, now U.S. Pat. No. 6,657,648. The entire disclosure of the prior application is hereby incorporated by reference herein in its entirety.

BACKGROUND OF THE INVENTION

1. Field of the Invention

The present invention relates to a display unit containing a display driver IC (integrated circuit) and an MPU controlling the display driver IC, an electronic device using the display unit, and a method of inspecting the display unit.

2. Description of the Related Art

FIG. 1 is a schematic sectional view of a display unit of a cellular phone. As shown in FIG. 1, the display unit of a cellular phone comprises a liquid crystal module 20 using a liquid crystal display driver IC 10 with an inspection circuit built therein, a printed circuit board 30 with an MPU 300 mounted thereon, and a connector 40 electrically connecting the liquid crystal module 20 and the printed circuit board 30. The connector 40 is made of an elastic connecting member (zebra rubber) having conductive parts and insulating parts alternately formed, for example. The elastic connecting member 40 is formed from conductive parts and insulating parts alternately layered in the longitudinal direction from the back side to front side of the drawing in FIG. 1. The terminals of the liquid crystal module 20 and the terminals of the printed circuit board 30 are electrically connected by evenly applying a pressure to the elastic connecting member 40 in the longitudinal direction.

The liquid crystal module 20 has a liquid crystal display section 28 having a structure in which a liquid crystal 26 is sealed between two glass substrates 22 and 24. The liquid crystal display driver IC 10 is mounted on the extended portion of the substrate 24.

Here, if the pressure applied to the elastic connecting member 40 is not even, the connection of the liquid crystal module 20 and the printed circuit board 30 becomes faulty.

Inspection of the connection has conventionally been performed by driving the liquid crystal display driver IC 10 based on a signal from the MPU 300 for displaying the display patterns on the liquid crystal display section 28 and visually inspecting the patterns.

The manufacturing process of this type of display unit has been completely automated except the above-described visual inspection process. Only the inspection process cannot be automated because it requires the visual inspection.

Moreover, because a faulty connection may be overlooked by mistake in the visual inspection, such inspection must be improved in terms of accuracy.

Furthermore, marketing strategy of electronic equipment manufacturers to satisfy recent demands of end users requires fabrication of several types of display units each having different specifications such as a display capacity, screen size, and other items. In this case, if the parts having different specifications are separately fabricated, not only an increased number of parts to be fabricated results in an increase in the cost, but also handling of the parts becomes complicated.

SUMMARY OF THE INVENTION

An object of the present invention is therefore to provide a display unit in which faulty connections of the connector can be automatically inspected, an electronic device using such a display unit, and a method of inspecting the display unit.

Another object of the present invention is to provide a display unit which can inspect abnormalities in the output of the booster circuit or the output of the oscillation circuit in the inspection process for faulty connections of the connector or which can read the ID of the display driver IC, an electronic device using such a display unit, and a method of inspecting the display unit.

Further object of the present invention is to provide a display unit in which the MPU can be used in common to a plurality of types of display driver ICs and can correctly set a controlling content for the display driver ICs built therein, an electronic device using such a display unit, and a method of inspecting the display unit.

A display unit of one aspect of the present invention comprises: a display section; a display driver IC driving the display section; a first board on which the display driver IC is mounted; an MPU sending a command and display data to the display driver IC; a second board on which the MPU is mounted; and a connector electrically connecting the first and second boards to each other, and further incorporates a device for inspecting the connection of the connector for faulty connection.

In the display unit of this aspect of the present invention, the MPU has a circuit for sending a test command during inspection mode, and reading an inspection result signal output thereafter from the display driver IC, and the display driver IC includes: an interface circuit for outputting and inputting a signal to and from the MPU; a command decoder for decoding the test command input from the MPU via the interface circuit; and an inspection circuit for outputting the inspection result signal in accordance with the signal from the command decoder.

In the display unit of this aspect of the present invention and a method of inspecting the display unit, the MPU reads the inspection result signal input via the interface circuit and the connector so that a faulty connection of the connector is judged.

Specifically, when the inspection result signal is normal, the connection by the connector on the output paths of the inspection result signal can be judged to be normal. Since the condition of connection by the connector can be inspected in this manner without relying on visual inspection, the inspection process can be automated.

In this aspect of the present invention, the first board may be a glass plate and the display section may be a liquid crystal display section including the glass plate.

When the first board is a glass plate which is part of the liquid crystal display section, various circuits (including the MPU) other than the display driver IC driving the liquid crystal display section may be formed on the second board which is connected to the display driver IC via the connector.

In this aspect of the present invention, the display driver IC may comprise: a storage section to which display data input from the MPU via the interface circuit is written; a display driver driving the display section based on the display data written in the storage section; and a booster circuit that generates voltages to be supplied to the display driver by boosting voltage.

Here, the booster circuit may be connected with at least one booster capacitor through the connector.

On the other hand, the inspection circuit may comprise: a comparator comparing an output of the booster circuit with a reference value; and a latch circuit latching a fail status at a time when the output of the booster circuit falls below the reference value, according to a result of comparison by the comparator.

In the display unit of this configuration, the MPU may send a test command for monitoring an output voltage of the booster circuit driven by a booster clock in the inspection mode, and then may read the inspection result signal after waiting for at least one period of the booster clock.

The fail state is thereby latched by the latch circuit when at least one booster capacitor is not normally connected to the booster circuit due to faulty connection. In this abnormal situation, the above-described fail state occurs without fail during one period of booster clock. Therefore, the faulty connection can be detected when the MPU reads the inspection result signal after one period of booster clock or a longer time.

In this aspect of the present invention, the display driver IC may have an ID setting circuit incorporated therein.

In this case, the MPU may send a test command for monitoring an output of the ID setting circuit during the inspection mode. The inspection circuit may output the inspection result signal according to the outputs of the ID setting circuit after the test command is decoded by the command decoder. It is also possible for the MPU to judge whether the connection condition of the connector is normal or abnormal by reading the inspection result signal as the ID information.

It is more preferable that the inspection circuit outputs the inspection result signal including high significant bits and low significant bits based on the output of the ID setting circuit, and the high significant bits and the low significant bits are brought into a relationship of non-inverted and inverted based on a signal produced by decoding the test command by means of the command decoder.

In this case, the MPU can decide the connection condition of the connector by judging whether the high significant bits and the low significant bits of the inspection result signal are in a relationship of non-inverted and inverted.

In this aspect of the present invention, the display driver IC may have an oscillation circuit that oscillates based on the logic power supply voltage supplied via the connector; and the interface circuit may have a data input-output terminal, a serial clock terminal, and an autoreturn circuit that switches the data input-output terminal between an input-allowable state and an output-allowable state every time a predetermined number of serial clock pluses supplied from the MPU via the serial clock terminal is counted.

In this case, the MPU may send the test command for monitoring an output of the oscillation circuit and the predetermined number of serial clock pluses in the inspection mode, may stop sending the serial clock pluses when inputting the output from the oscillation circuit via the inspection circuit and the data input-output terminal, and may send the predetermined number of serial clock pluses after reading the output of the oscillation circuit. On the other hand, the display driver IC may set the data input-output terminal in the input-allowable state according to an operation of the autoreturn circuit that counts the serial clock pluses input after sending the output of the oscillation circuit.

Usually the frequency of the output of the oscillation circuit is sufficiently lower than the frequency of the serial clock, so that the output of the oscillation circuit may not change at all when the output of the oscillation circuit is monitored according to the serial clock. For this reason, the serial clock is stopped while the output of the oscillation circuit is being monitored. After reading the output of the oscillation circuit, the MPU sends a predetermined number of serial clock pulses so that the input-output terminal can be switched to the input-allowable state.

A display unit of another aspect of the present invention comprises: a display section; a display driver IC driving and controlling the display section; and an MPU sending a command and display data to the display driver IC, and the display driver IC comprises: an ID setting circuit; and a command decoder decoding the command from the MPU, the MPU has a storage section for storing a plurality of types of control contents for a plurality of types of display driver ICs including the display driver IC, the MPU sends an ID monitor command to the display driver IC when the MPU reads an ID from the ID setting circuit, the display driver IC sends ID information from the ID setting circuit to the MPU in accordance with a signal generated by the command decoder decoding the ID monitor command, and the MPU reads the ID information and so as to control the display driver IC according to the corresponding control contents in the storage section.

This configuration not only enables the MPU to be used commonly by a plurality of types of display driver ICs, but also ensures the control contents for the display driver IC connected to the MPU to be selected according to the ID information read out from the display driver IC.

An electronic device of further aspect of the present invention comprises the display unit described above so that display malfunction may be reduced.

DETAILED DESCRIPTION OF THE PREFERRED EMBODIMENT

An embodiment in which the present invention is applied to a liquid crystal device used for a cellular phone will be hereinafter explained with reference to the drawings.

Outline of the Entire Liquid Crystal Device

Figure 1:
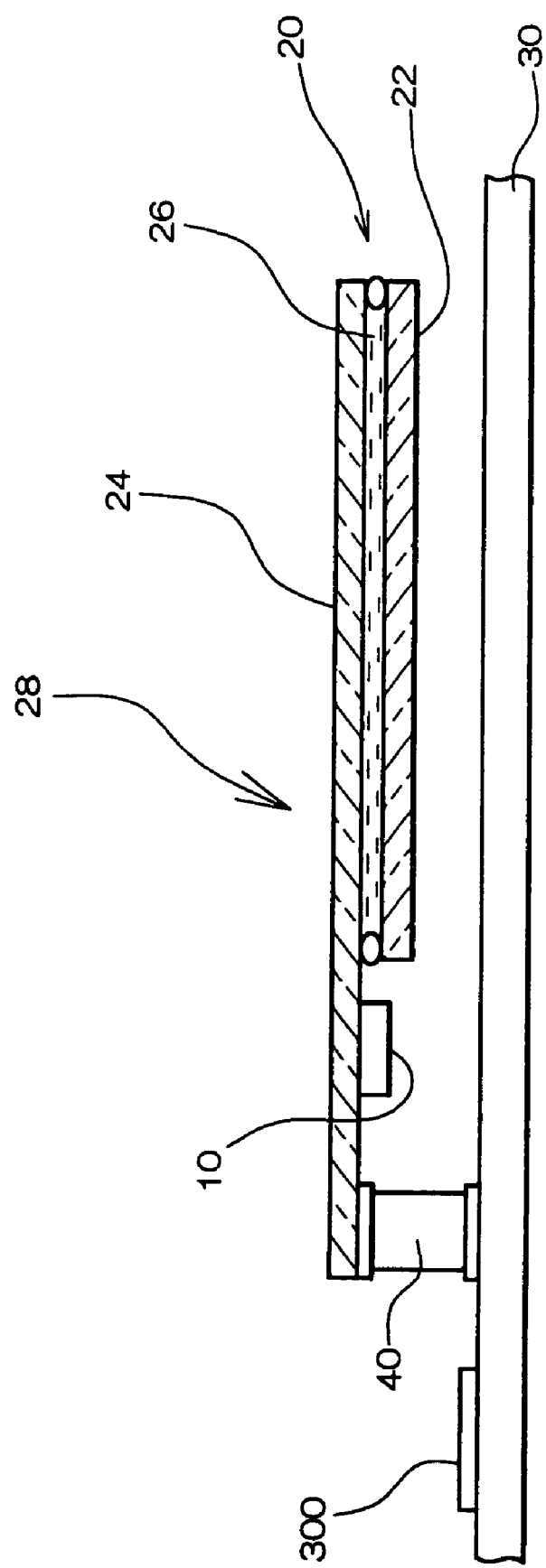
FIG. 1 is a schematic sectional view of a liquid crystal module provided with a liquid crystal display driver IC mounted thereon according to an embodiment of the present invention.

The liquid crystal device of this embodiment of the present invention also has the display unit for a cellular phone shown in FIG. 1. In FIG. 1, a first board is a glass plate 24 that is a component of the liquid crystal display section 28, and a liquid crystal display driver IC 10 is mounted on the glass plate 24. A second board is a printed circuit board 30 with an MPU mounted thereon, which is connected to the first board 24 by a connector (elastic connecting member, such as zebra rubber). It is to be noted that the liquid crystal module 20 shown in FIG. 1 has a back light or a side light mounted thereon if it is used for a transmission type liquid crystal display device, but requires no light source if it is a reflecting type.

Figure 14:
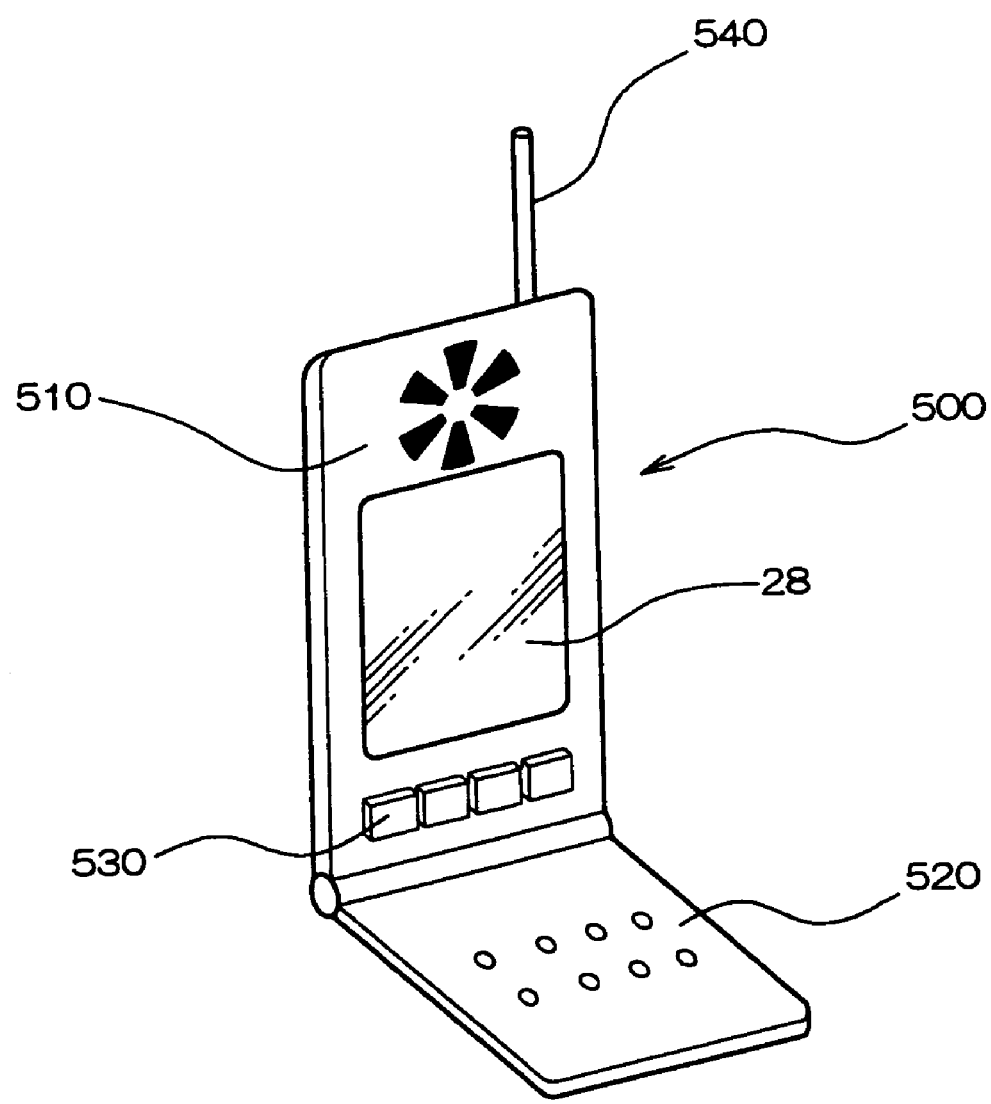
FIG. 14 is a schematic perspective view of a cellular phone as an example of an electronic device provided with the liquid crystal module shown in FIG. 1.

As shown in FIG. 14, the liquid crystal module 20 is disposed in a cellular phone 500 so that the liquid crystal display section 28 is exposed. The cellular phone 500 comprises, in addition to the liquid crystal display section 28, a receiver section 510, a transmitter section 520, an operating section 530, an antenna 540, and the like. The MPU 300 sends command data or display data to the liquid crystal module 20 according to the information received by the antenna 540 or the information input by the operating section 530.

Liquid Crystal Display Driver IC

Figure 2:
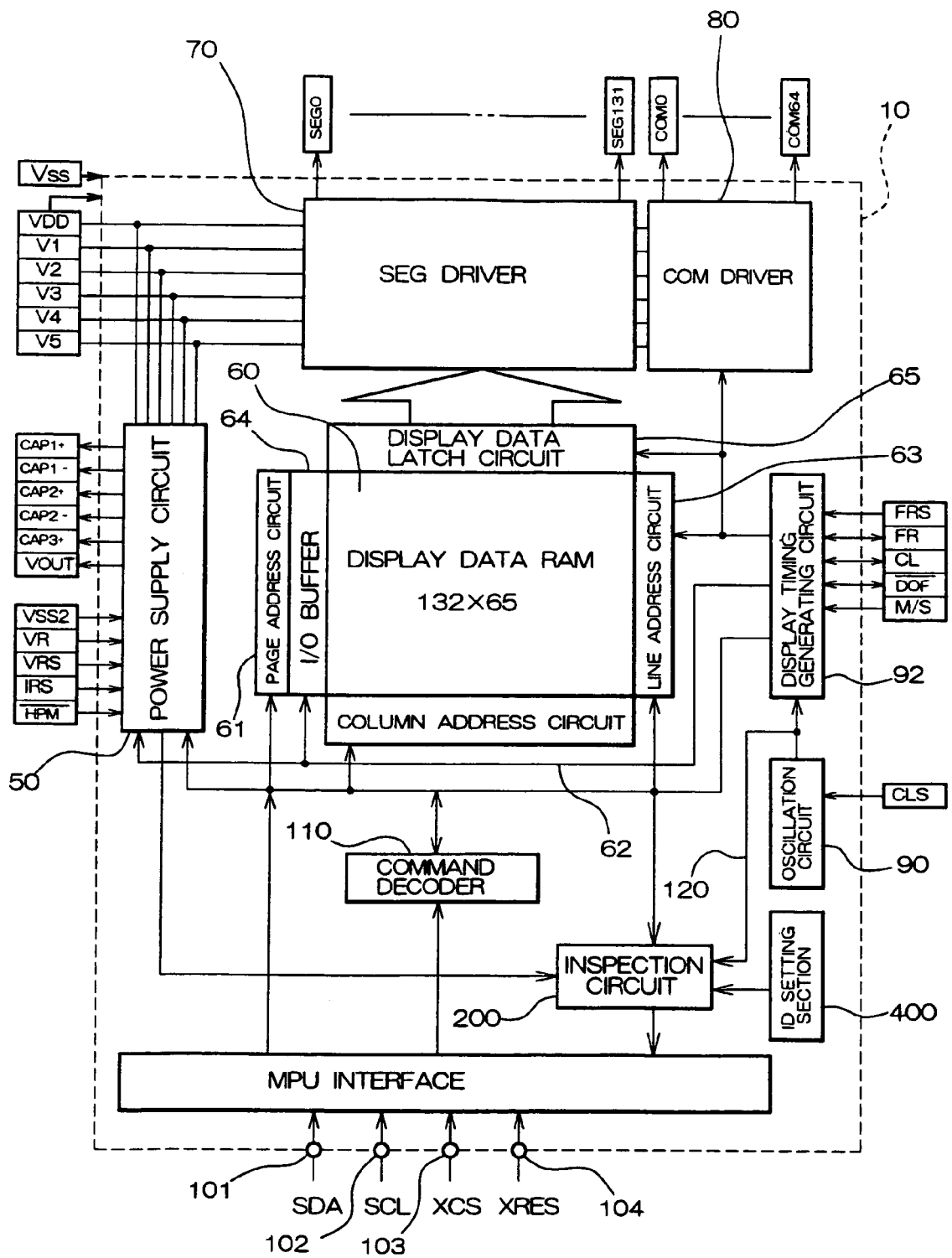
FIG. 2 is a block diagram of the liquid crystal display driver IC shown in FIG. 1.

FIG. 2 is a block diagram showing the liquid crystal display driver IC. In FIG. 2, the liquid crystal driver IC 10 is provided with essential components for driving a liquid crystal such as a power source circuit 50, a display memory such as a display data RAM 60, a segment (SEG) driver 70 and a common (COM) driver 80 as display drivers, an oscillation circuit 90 and a display timing generating circuit 92. The display data RAM 60 is provided with memory cells equal in number (132×65) to pixels formed at the intersecting points between 132 segment electrodes SEG 0 to SEG 131 and 65 common electrodes COM 0 to COM 64.

This liquid crystal display driver IC 10 also has an inspection circuit 200 and an ID setting circuit 400. The ID setting circuit 400 sets an ID that is particular to the liquid crystal display driver IC 10. The inspection circuit 200 in this embodiment serially outputs the inspection data (an inspection result signal) based on the signal from the power supply circuit 50, the oscillation circuit 90, or the ID setting circuit 400. The inspection data is input to the MPU 300 through a later-described MPU interface circuit 100 and a first input-output terminal 101.

The liquid crystal display driver IC 10 is further provided with an MPU interface 100, a command decoder 110, and an internal bus 120. In this embodiment, the MPU interface 100 has a first input-output terminal 101 for inputting various signals from the MPU 300 and a second to fourth input terminals 102 to 104. A serial data signal (SDA) is input or output through the first input-output terminal 101, a serial clock signal (SCL) is input to the second input terminal 102, a chip selection signal (XCS) is input to the third input terminal 103, and a reset signal (XRES) is input to the fourth input terminal 104.

Here, the serial data signal (SDA) includes command data and display data as the data input from the MPU 300, and the above-described inspection data as the output data from the liquid crystal display driver IC 10. These serial data signals (SDA) are composed of the number of bits that the MPU 300 processes simultaneously; 1 byte (8 bits) in this embodiment. The number of bits of command data or display data may be designed to be one word (16 bits) or one long word (32 bits).

When the chip select signal (XCS) is active (e.g., LOW active), the MPU interface 100 transfers the serial data signal (SI) according to the serial clock signal (SCL) and makes a serial-parallel conversion of the signal to input or output the converted signal.

The MPU interface 100 sends command data in parallel to the command decoder 110 when the serial data signal (SDA) is command data and sends display data in parallel to the internal bus line 120 when the serial data signal (SDA) is display data.

Further, the MPU interface circuit 100 has a function of outputting the inspection data from the inspection circuit 200 through the first input-output terminal 101.

The decoded command data is used as an operating command for the power source circuit 50 and the display timing generating circuit 92 and is also used to assign each address of a page address circuit 61, a column address circuit 62, and a line address circuit 63 which are connected to the display data RAM 60. When the command data decoded is a command requesting inspection data from the inspection circuit 200, the first input-output terminal 101 is put in the output-allowable state, and the inspection data from the inspection circuit 200 is output.

On the other hand, parallel display data is written through the I/O buffer 64 of the display data RAM 60 to the memory cells in the display data RAM 60 according to the page address and column address specified by a command.

The display data RAM 60 functions as a field or frame memory of the liquid crystal display section 28 of the liquid crystal module 20. The display data written in the display data RAM 60 is read out through address assignment according to a timing signal from the display timing generating circuit 92 and latched by a display data latch circuit 65. The display data latched by the display data latch circuit 65 is converted into data required for driving a liquid crystal, for instance, of five potential levels V1 to V5, and supplied to the segment electrodes SEG 0 to SEG 131 of the liquid crystal display section 28.

A potential is supplied to the segment electrodes SEG 0 to SEG 131 based on a timing signal from the display timing generating circuit 92 while switching the common electrodes COM 0 to COM 64 via the common (COM) driver 80, whereby the liquid crystal display section 28 is driven.

Description of Built-In Inspection Circuit

Figure 3:
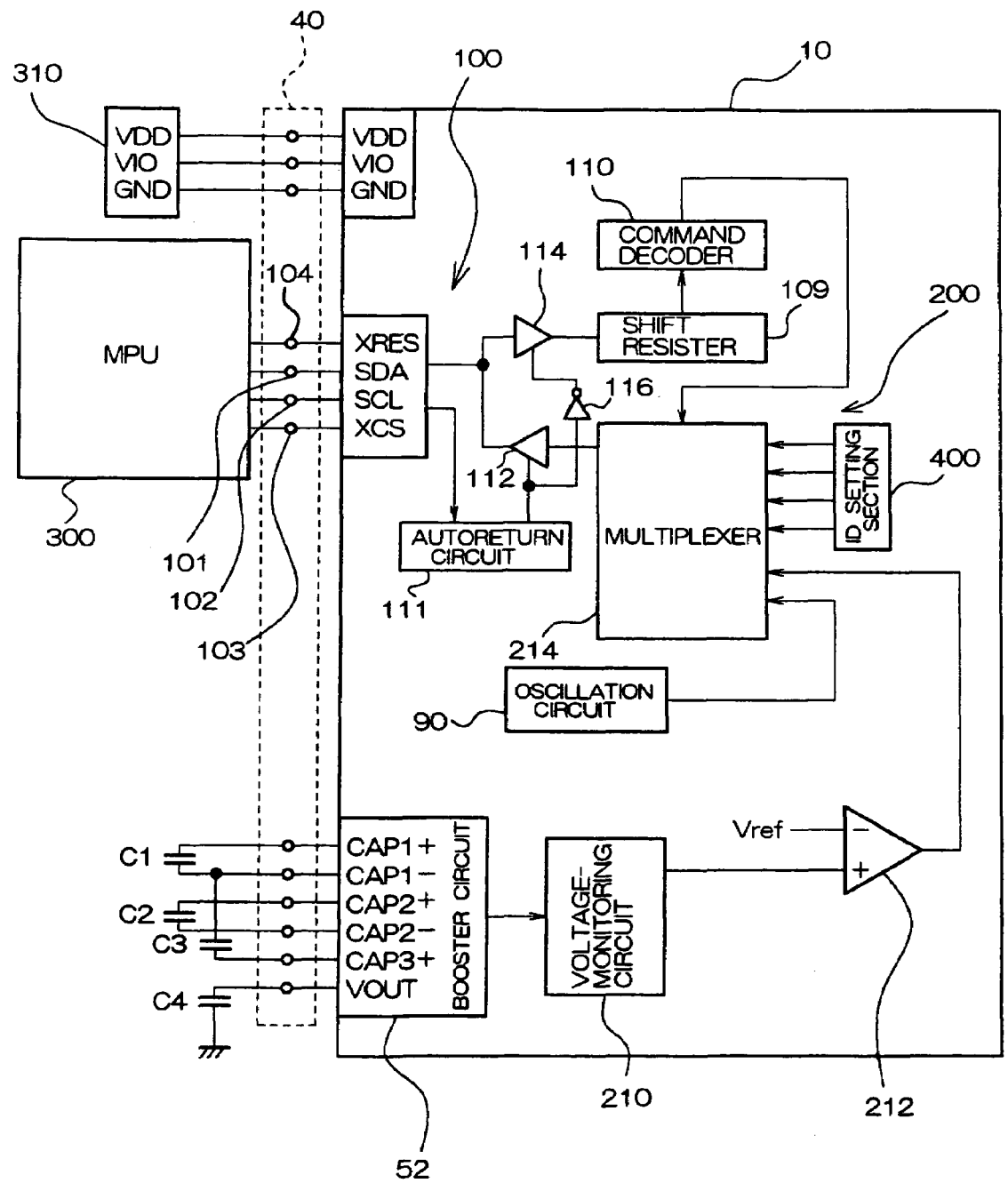
FIG. 3 is a block diagram of the inspection circuit shown in FIG. 2 and the structure related to the operation of the inspection circuit.

FIG. 3 shows the inspection circuit 200 in FIG. 2 and the configuration related to the operation of the inspection circuit 200. The inspection circuit 200 has a function of serially outputting the output of the booster circuit 52 formed inside the power supply circuit 50, the output of the oscillation circuit 90, and the output of the ID setting circuit 400 shown in FIG. 2 according to the signal from the command decoder 110. For this purpose, the inspection circuit 200 has a voltage-monitoring circuit 210, a comparator 212, and a multiplexer 214 as shown in FIG. 3.

The voltage-monitoring circuit 210 divides the output of the booster circuit 52 by resistance division to generate a monitor voltage corresponding to the reference voltage Vref which is input to the comparator 212. The comparator 212 compares the monitor voltage with the reference voltage Vref and outputs the comparison result. The multiplexer 214 serially send the outputs of the oscillation circuit 90, the comparator 212, and the ID setting circuit 400, while switching these outputs according to the signals of the command decoder 110.

The MPU interface 100 has an autoreturn circuit 111, a first and second transmission gates 112 and 114, and an inverter circuit 116 for switching the first output terminal 101 between the input-allowable state and output-allowable state. The autoreturn circuit 111 reverses the output every time when it counts eight pulses of the serial clock signal (SCL) from the second input terminal 102. The first transmission gate 112 is turned on by the output H of the autoreturn circuit 111. The second transmission gate 114 is turned on by the H signal that is the output L of the autoreturn circuit 111 inverted by the inverter 116. The inspection data can be output from the multiplexer 214 by turning on the first transmission gate 112. On the other hand, the command data and other data from the first input-output terminal 101 are brought into the condition to be input into the liquid crystal driver IC 10 by turning on the second transmission gate 114. A shift register 109 is connected to the second transmission gate 114. A command data input serially is shifted bit by bit therein and input to the command decoder 110 in 8-bit parallel data.

Further, in FIG. 3, logic voltages VDD (2.7 V, for example), VIO (1.8 V, for example), and GND (0 V) from a power IC 310 are supplied to the logic voltage input section of the liquid crystal drive IC 10 through the elastic connecting member 40. The external capacitors C1 to C4 for boosting voltage are connected to the booster circuit 52 through the connector 40.

Multiplexer's Configuration

Figure 4:
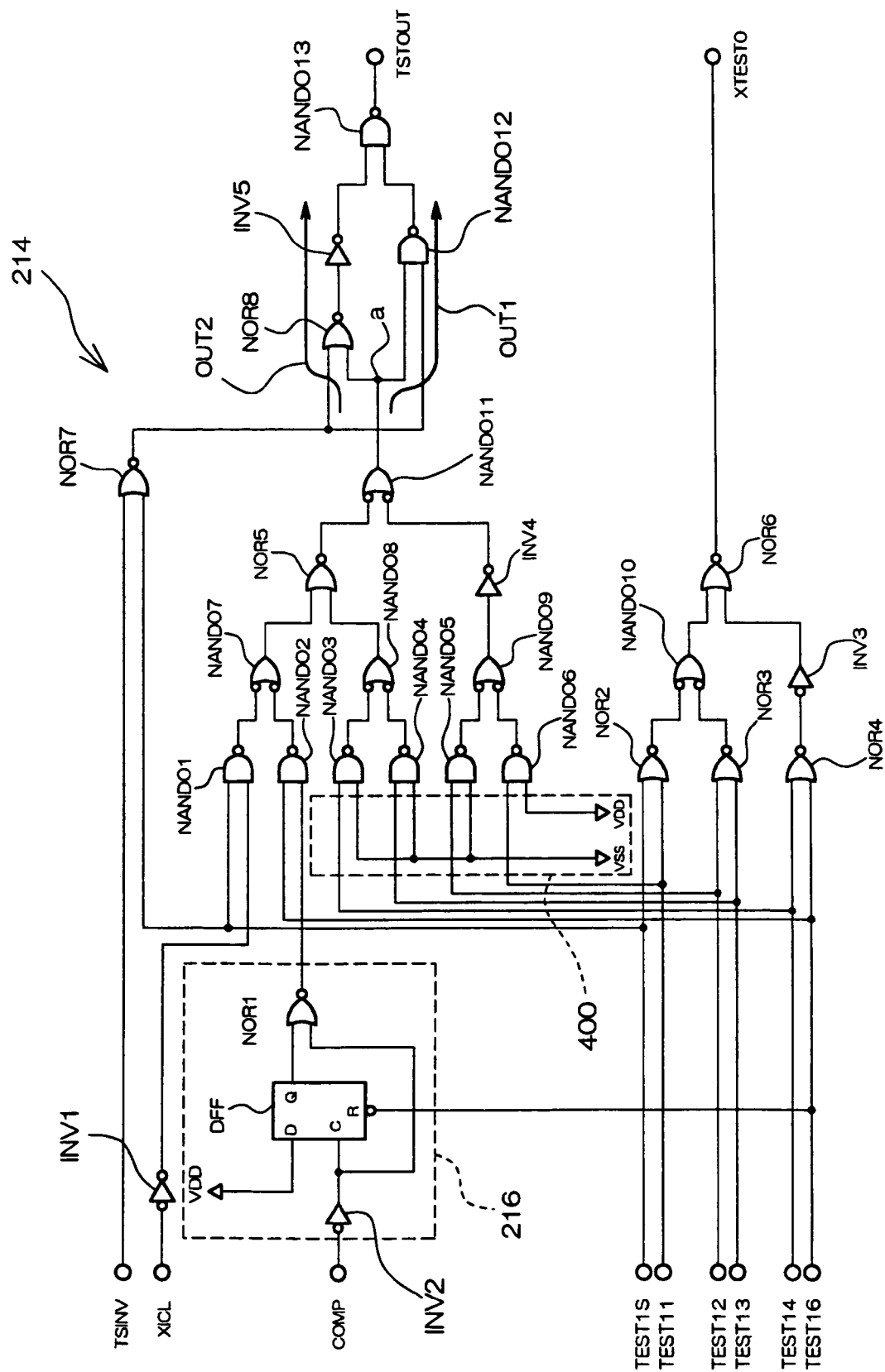
FIG. 4 is a logic circuit diagram of the multiplexer shown in FIG. 3.

FIG. 4 is a logic circuit diagram of the multiplexer 214 shown in FIG. 3. To this multiplexer 214 the oscillating output XCICL from the oscillating circuit 90, the output COMP from the comparator 212, or the output from the ID setting circuit 400 is selected according to the output TSINV, TEST1S, TEST11 to TEST14, and TEST16 from the command decoder 110 shown in FIG. 3, and the output TSTOUT of the multiplexer 214 is obtained. For this purpose, the multiplexer 214 has inverters INV1 to INV5, NAND gates NAND1 to NAND13, NOR gates NOR1 to NOR8, and a D-type flip-flop DFF. The inverter INV2, D-type flip-flop DFF, and NOR gate NOR1 function as a circuit 216 that latches the fail status when the output of the comparator 212 is LOW. As another output XTESTO of the multiplexer 214, LOW is output during the inspection at the inspection circuit 200 and HIGH is output at any other time.

Here, the signal TEST1S shown in FIG. 4 is held HIGH only when monitoring the output of the oscillation circuit 90. The signal TEST16 is held HIGH only when monitoring voltages according to the output of the comparator 212. The signals TEST11 to TEST14 are held HIGH in turn one after another when monitoring the ID from the ID setting circuit 400.

Further, the signal TSINV shown in FIG. 4 is used for switching so that the output signal at the node "a" shown in FIG. 4 is output through either one of the non-inverting output path OUT1 or the inverting output path OUT2 as shown in FIG. 4. When the output signal at node "a" passes through the non-inverting output path OUT1, the logic is output without changing; and when the output signal at node "a" passes through the inverting output path OUT2, the inverted logic is output.

Oscillation Circuit Output Monitoring Process

Figure 5:
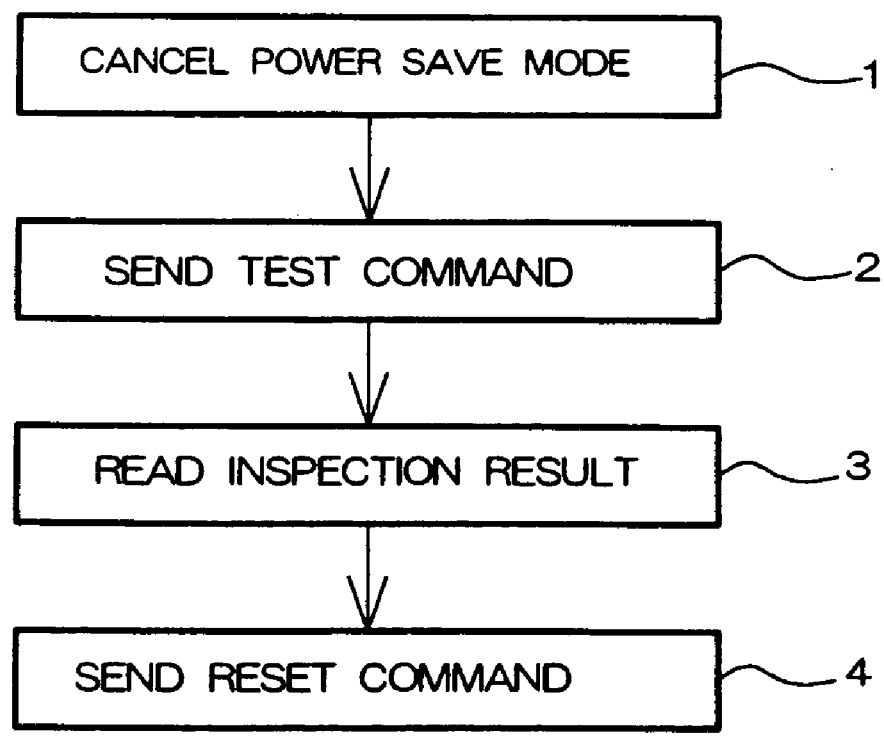
FIG. 5 is a flowchart of the process of monitoring the output of the oscillation circuit of the liquid crystal display driver IC.
Figure 6:
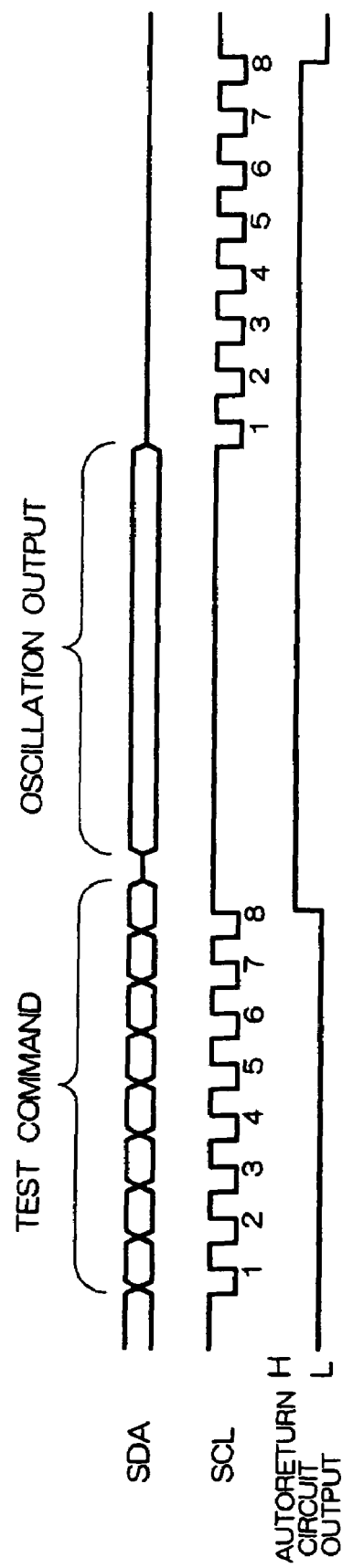
FIG. 6 is a timing chart for the process of monitoring the output of the oscillation circuit of the liquid crystal display driver IC.

First, the method of inspecting whether the oscillation circuit 90 of the liquid crystal display drive IC 90 is normal or not normal is described by referring to the flowchart in FIG. 5 and the timing diagram in FIG. 6. As shown in FIG. 5, the MPU 300 cancels the power save mode of the liquid crystal display driver IC 10 (Step 1 in FIG. 5). This step is performed to operate the oscillation circuit 90 in the normal mode, not in the power save mode.

Next, the MPU 300 outputs the test command for monitoring the output of the oscillation circuit 90 by the MPU 300 (Step 2 in FIG. 5). The 8-bit test command is output being synchronized with eight pulses of the serial clock SCL of as shown in FIG. 6, and input serially to the liquid crystal display driver IC 10 via the first input-output terminal 101.

This test command is input serially to the shift register 109 through the second transmission gate 114 shown in FIG. 3. The shift register 109 shifts the serial data according to the serial clock signal (SCL) which is input via the second input terminal 102, and outputs the 8-bit test command D0 to D8 in parallel. This test command is decoded by the command decoder 110. The multiplexer 214 is controlled so as to select and output the output from the oscillation circuit 90.

Specifically, among signals TSINV, TEST1S, TEST11 to TEST14, and TEST16 shown in FIG. 4 that are the outputs from the command decoder 110, the signal TESTLS alone goes HIGH, and the other signals are LOW during the monitoring process of the oscillation circuit output.

At this time, the logic of the output XICL of the oscillation circuit 90 is inverted by each of the inverter INV1, NAND gate NAND1, NOR gate NOR7, NOR gate NOR15, and NAND gate NAND11, and consequently the inverted output of the output XICL of the oscillation circuit 90 is obtained at the node "a".

Here, the signals TSINV and TEST1S input to the NOR gate NOR7 are LOW and HIGH, respectively, and hence the output of the NOR gate NOR7 is set LOW. In this state, the inverting output path OUT2 in FIG. 3 is selected for the output path after the node "a".

The inverted output of the output XICL of the oscillation circuit 90 at the node "a" is therefore inverted by each of the NOR gate NOR8, inverter INV5, and NAND gate NAND13. Consequently the output XICL of the oscillation circuit 90 is selectively obtained from the output TSTOUT of the multiplexer 214.

In addition, the autoreturn circuit 111 in FIG. 3 counts eight pulses of the serial clock signal (SCL) when the 8-bit test command is input, whereby the second transmission gate 114 is turned off and the first transmission gate 112 is turned on. As a result, the output of the oscillation circuit 90 selected as the output of the multiplexer 214 is output to the external MPU 300 via the first input-output terminal 101.

Here, the oscillation circuit 90 is oscillating in the normal mode because the power save mode is canceled. At this time, the MPU 300 is set in the oscillation output read status (Step 3 in FIG. 5) and measures the oscillation frequency of the oscillation circuit 90. In this step, it is preferable that the MPU 300 stops the generation of the serial clock signal (SCL). The oscillation output is of a low frequency, for example, several ten kilohertz, whereas the serial clock signal (SCL) is of a high frequency, for example, 4 MHz. Therefore, measuring the low-frequency oscillation output to the timing of the serial clock signal (SCL) only results in many times of measurements of the state of the oscillation output without change. For this reason, the oscillation frequency is measured by stopping the serial clock signal (SCL) and reading the change in the level of the oscillation output to a constant timing suited to the oscillation frequency or by using an event counter.

After this measurement is completed, the MPU 300 outputs eight serial clock pluses (SCL) as shown in FIG. 6. By this clocks having been counted by the autoreturn circuit 111 of the liquid crystal display driver IC 10, the first transmission gate 112 is turned off, the second transmission gate 114 is turned on, and thereafter this inspection item is reset (Step 4 in FIG. 5).

Significance of this monitoring of the oscillation output of the oscillation circuit 90 resides in that, since the oscillation circuit 90 operates on the logic voltage supply from the logic voltage input section 54, the operator can know that the normal logic voltages are supplied to the logic voltage input section 54 if the oscillation output is normal. This indicates that the contact of the elastic connection material 40 of the power IC310 and the logic voltage input section 54 is normal.

Further, it is known that the first input-output terminal 101 and the second input terminal 102 (serial interface) are also maintained in normal contact based on the fact that the command data from the MPU 300 and the oscillation output data from the liquid crystal display driver IC 10 can be normally input or output.

ID Monitoring Process

Figure 7:
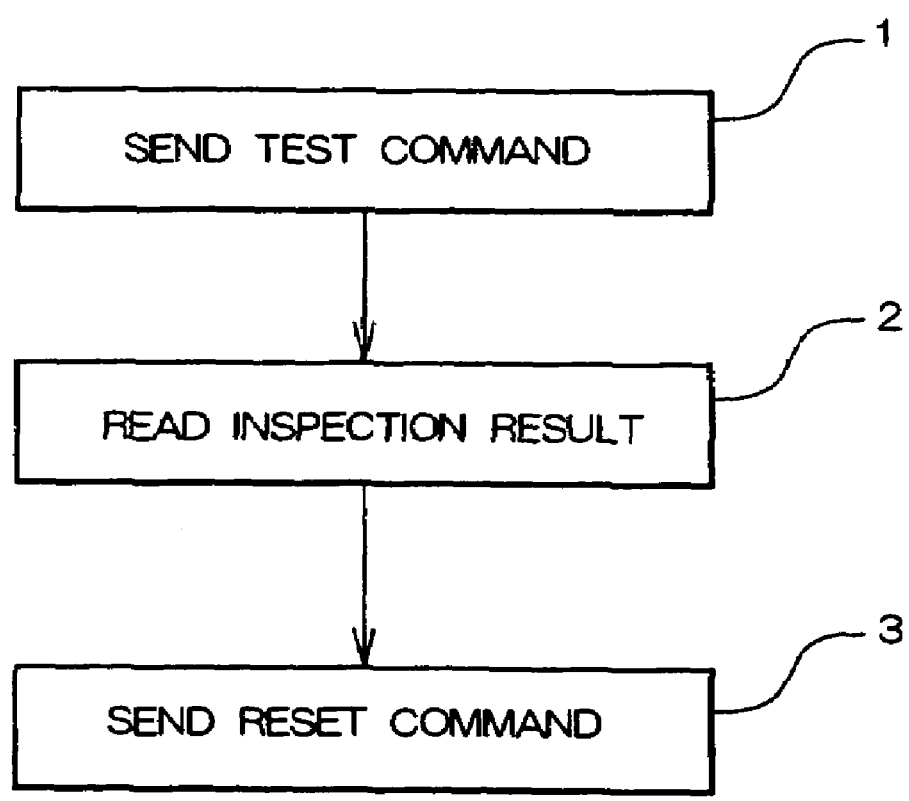
FIG. 7 is a flowchart of the process of monitoring the ID from the ID setting circuit of the liquid crystal display driver IC.
Figure 8:
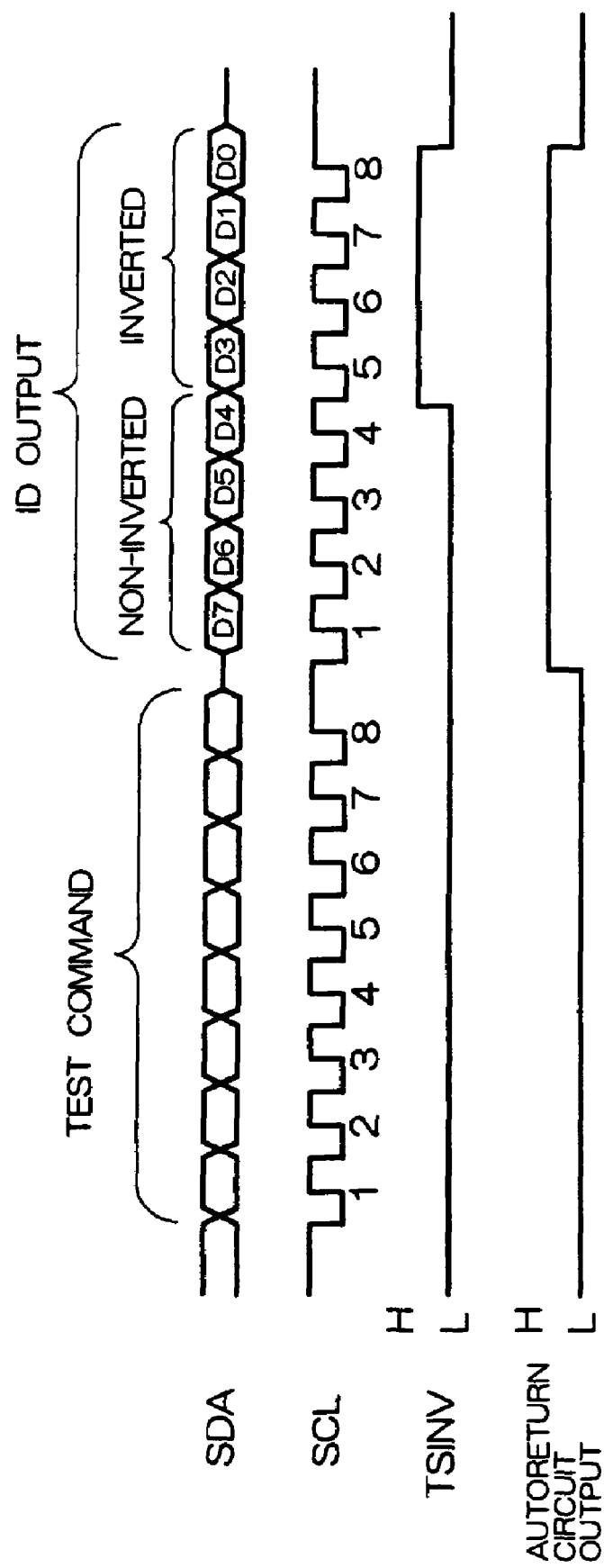
FIG. 8 is a timing chart of the process of monitoring the ID from the ID setting circuit of the liquid crystal display driver IC.

Next, the process of monitoring the ID from the ID setting circuit 400 of the liquid crystal display driver IC 10 is described by referring to the flowchart in FIG. 7 and the timing diagram in FIG. 8.

Although the ID monitoring process is preferably performed following the oscillation output monitoring process described above when the result of the inspection is normal, it may also be performed at another timing.

Here, in the ID setting circuit 400 shown in FIG. 4, the one input terminal of the NAND gate 6 is connected to voltage VDD and one input terminal of each of the other NAND gates 3 to 5 is connected to potential VSS in order to set a particular ID for the liquid crystal display driver IC 10. $2^4=16$ IDs can be set by changing the wiring.

To read the ID of the liquid crystal display driver IC 10, the test command is input from the MPU 300 to the liquid crystal display driver IC 10. By this command, the signals TEST11 to TEST14 to the other input terminals of the aforementioned NAND gates NAND3 to NAND6 are brought HIGH selectively one after another in the order from TEST14 to TEST1. In this instance, signal TSINV is held LOW in the first half period during which the outputs of the NAND gates NAND3 to NAND6 are read out, and held HIGH in the second half period. The other signals TEST1S and TEST16 shown in FIG. 4 are held LOW. By this setting, ID1 to ID4, each consisting of 8 bits, shown in Table 1 below are read out one by one, and IDs of 32 bits in total are monitored by the MPU 300.

TABLE 1

| Type of ID | ID Read | High Significant Bits Non-inverted | | | | Low Significant Bits Inverted | | | |
|---|---|---|---|---|---|---|---|---|---|
| | | D7 | D6 | D5 | D4 | D3 | D2 | D1 | D0 |
| ID1 | NAND6 | 1 | 1 | 1 | 1 | 0 | 0 | 0 | 0 |
| ID2 | NAND5 | 0 | 0 | 0 | 0 | 1 | 1 | 1 | 1 |
| ID3 | NAND4 | 0 | 0 | 0 | 0 | 1 | 1 | 1 | 1 |
| ID4 | NAND3 | 0 | 0 | 0 | 0 | 1 | 1 | 1 | 1 |

Here, the test command for reading out the ID is decoded by the command decoder 110 via the input-output terminal 101, the second transmission gate 114, and the shift register 109 in the same manner as described above. The multiplexer 214 is thereby controlled so as to select the output of the ID setting circuit 400 and output it.

TEST11 is first brought to HIGH, and TEST12 to TEST14 are held LOW by this test command. The signal TSINV is held LOW at first. Consequently, one input voltage VDD (HIGH) is inverted by each of the NAND gate NAND9, inverter INV4, and NAND gate NAND11, and hence HIGH is obtained at the node "a". At this time, since the output of the NAND gate NAND7 is held HIGH, the non-inverting output path OUT1 is selected, and the logic HIGH at the node "a" is obtained as is as the output TSTOUT of the multiplexer 214.

This output of the multiplexer 214 is output by the MPU interface 100 in accordance with the serial clock signal CLK, that is, the status of each of the high significant four bits D7 to D4 is output as "1" as shown in the above Table 1 and FIG. 8.

After this, the signal TSINV is switched from LOW to HIGH as shown in FIG. 8. The output of the NAND gate NAND7 is thereby fixed to LOW, and the inverting output path OUT2 is selected. The logic HIGH at the node "a" is thereby inverted, and LOW is obtained as the output TSTOUT of the multiplexer 214.

This output of the multiplexer 214 is also output by the MPU interface 100 in accordance with the serial clock signal CLK, that is, the status of each of the low significant four bits D3 to D0 is output as "0" as shown in the above Table 1 and FIG. 8.

In the same manner, non-inverted high significant four bits and inverted low significant four bits are obtained as ID2 to ID4 shown in Table 1 by bringing the signals TEST12, TEST13, and TEST14 HIGH one by one.

ID1 to ID4, 32 bits in total, shown in Table 1 are thus input to the MPU 300, and the MPU 300 reads the ID (Step 2 in FIG. 7). If the eight bits of each of ID1 to ID4 having been input to the MPU 300 have the low significant four bits inverted against the logic of the high significant four bits, the connection of the logic power supply and that of the serial interface can be judged to be normal. This is because the eight bits of each of ID1 to ID4 do not have the non-inverted and inverted logic states by four bits if there is any abnormality in these connections.

A parity check is generally performed to check whether serial data is being transferred normally. In the parity check, the number of data "1"s is checked using an adder. However, an adder occupies a substantial area in the IC because of possession of a large circuit size. This embodiment makes it possible to judge whether the serial interface is normal without need of such a large circuit. After judgement, the MPU 300 sends the reset command, whereby the ID monitoring process terminates (Step 3 in FIG. 7).

Voltage Monitoring Process

Next, the voltage monitoring process that checks whether the output voltage VOUT of the booster circuit 52 in the liquid crystal display driver IC 10 is normal or not will be described.

Although this voltage monitoring process is preferably performed following the ID monitoring process described above when the result of the inspection is normal, it may also be performed at any other timing.

Figure 9:
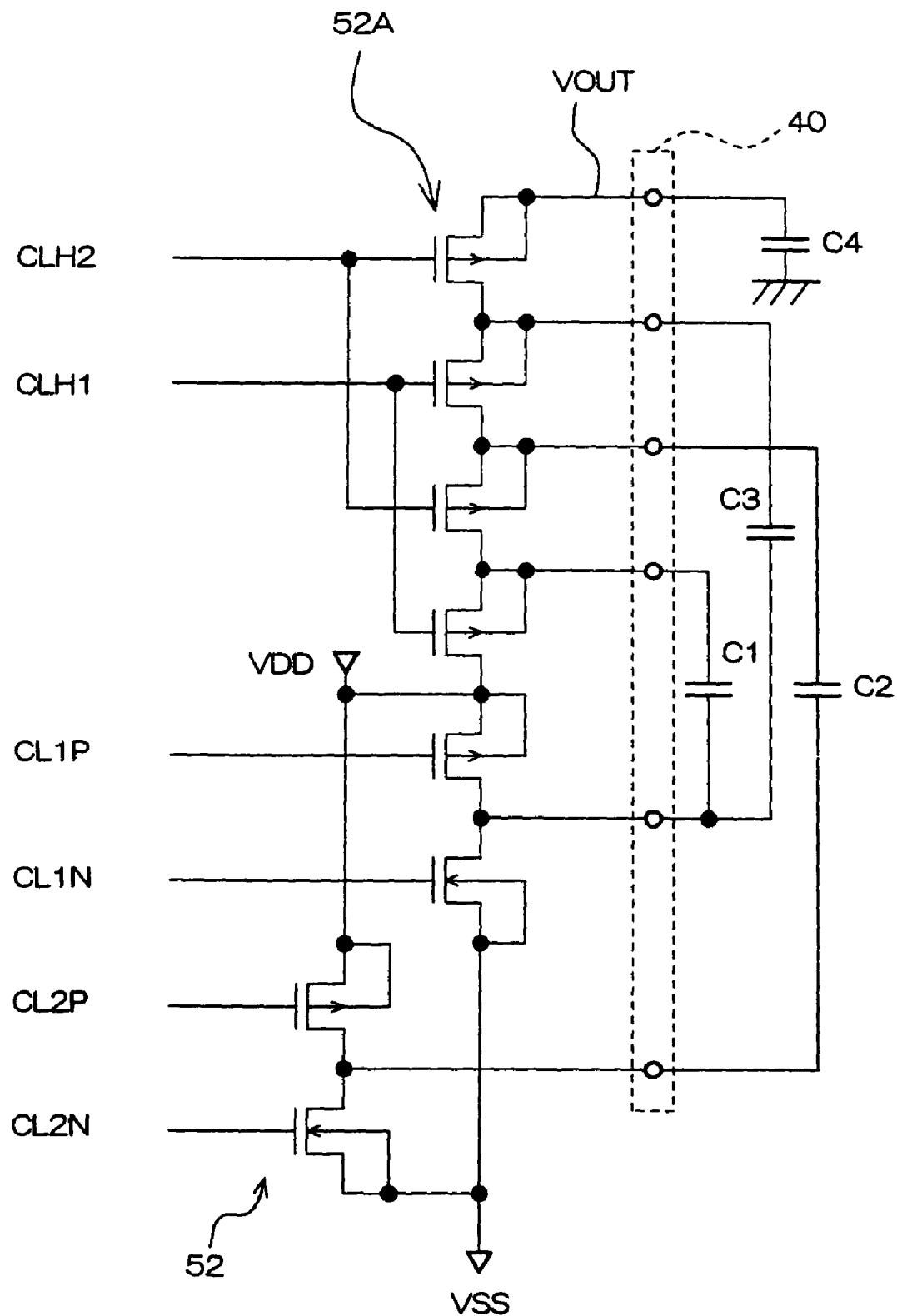
FIG. 9 is a circuit diagram showing the booster circuit shown in FIG. 3 and the external booster capacitors.
Figure 10:
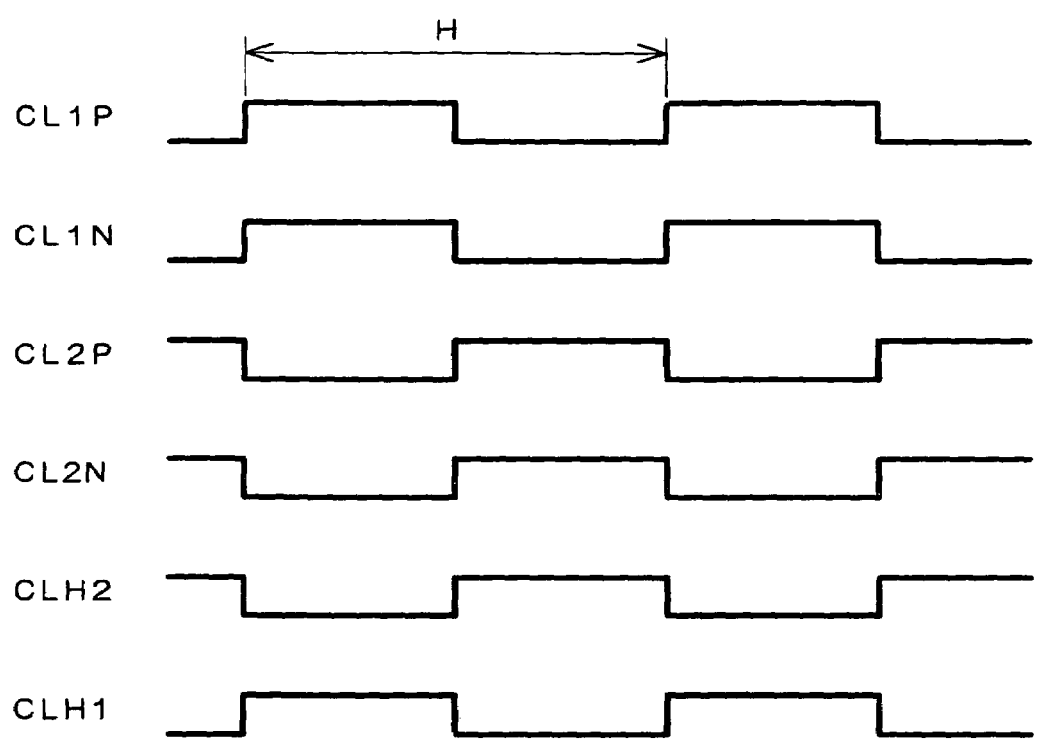
FIG. 10 shows waveforms of the booster clock signal applied to the booster transistors shown in FIG. 9.

First, the configuration and operation of the booster circuit 52 are described by referring to FIGS. 9 and 10. FIG. 9 shows the booster circuit 52 and its external booster capacitors C1 to C4. FIG. 10 shows waveforms of the booster clock signal for driving the booster transistors shown in FIG. 9.

As shown in FIG. 9, the booster capacitors C1 to C4 are connected to the group of booster transistors 52A via the elastic-connecting member 40. The booster clock signals CLH1, CLH2, CL1P, CL2P, CL1N, and CL2N are applied to the gates of the booster transistors 52A at the timing shown in FIG. 10. These booster clock signals are generated by dividing the output of the oscillation circuit 90. Therefore, this voltage-monitoring process may be preferably performed after the oscillation output of the oscillation circuit 90 has been decided to be normal.

Voltages of VDD2 (2.7 V, for example) and 2×VDD2 are alternately charged to the booster capacitor C1, voltages of 2VDD2 and 4×VDD2 are alternately charged to the booster capacitor C2, and voltages of 3×VDD2 and 4×VDD2 are alternately charged to the booster capacitor C3. As a result, a voltage of 4×VDD2 (2.7 V×4=10.8, for example) is charged to the booster capacitor C4 and this voltage becomes the output voltage of the booster circuit 52.

Figure 11:
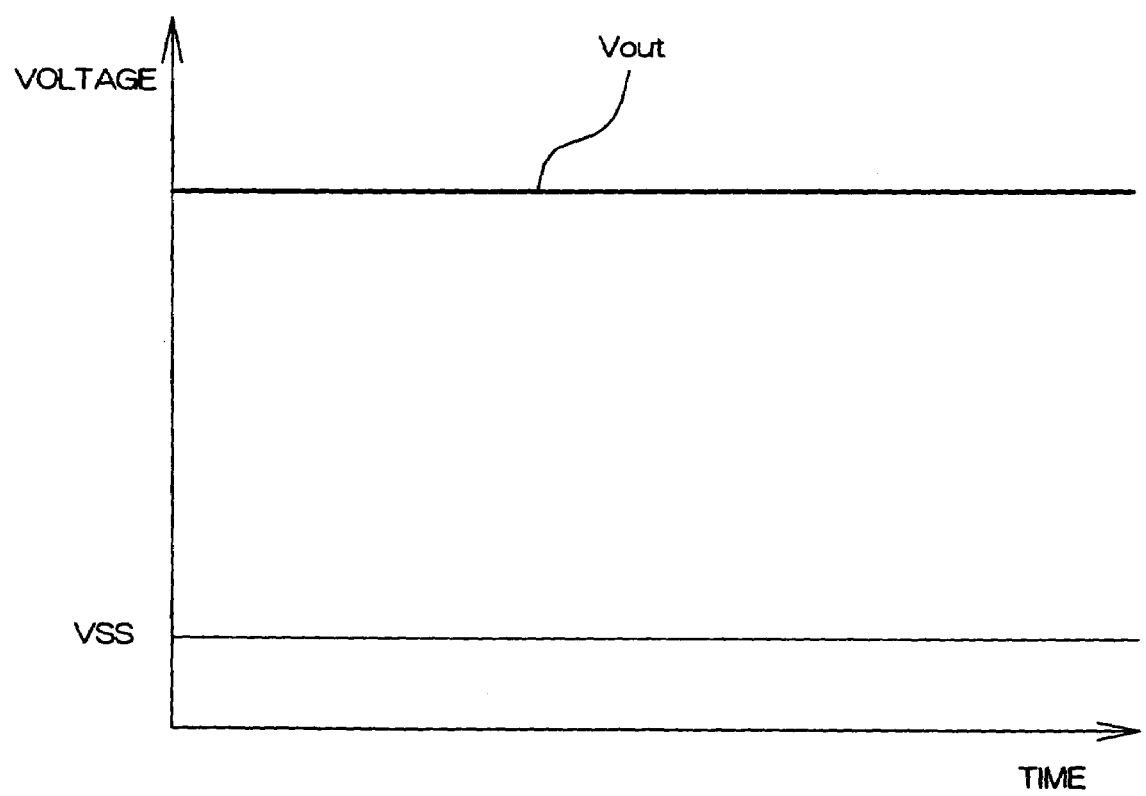
FIG. 11 shows a waveform of the output voltage of the booster circuit shown in FIG. 9 in a normal operation.
Figure 12:
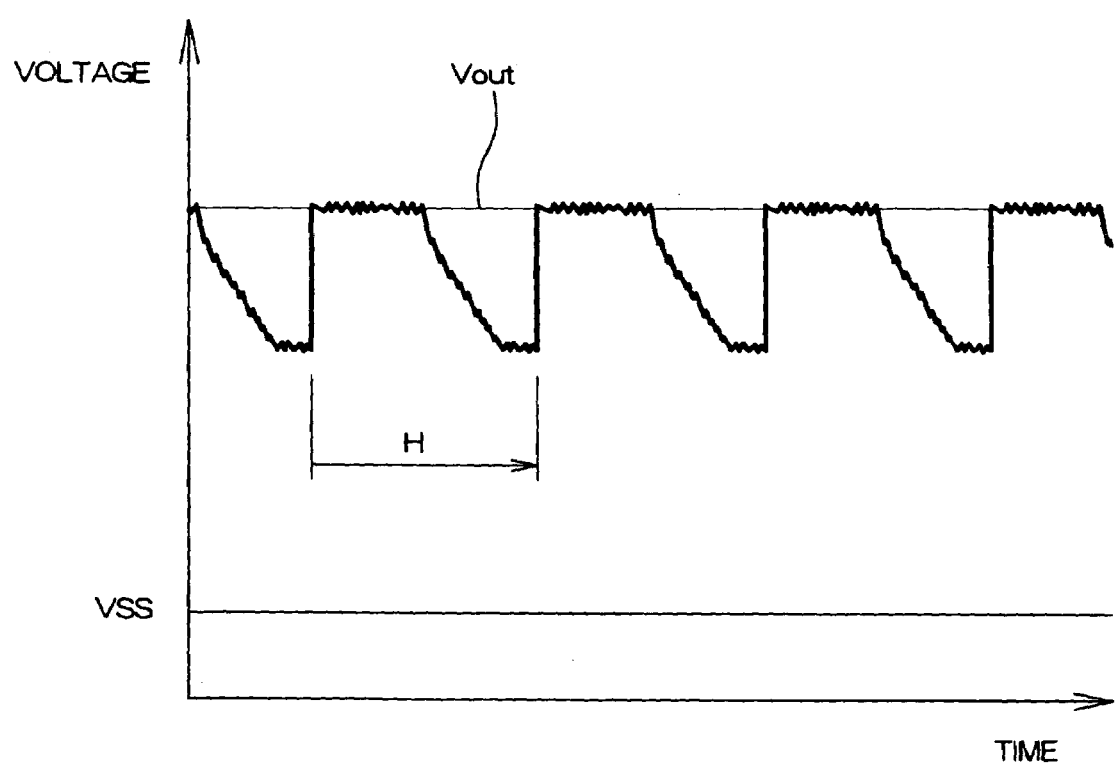
FIG. 12 is a waveform of the output voltage of the booster circuit shown in FIG. 9 in an abnormal operation.

The above-described operation requires connection between the booster transistors 52A and the booster capacitors C1 to C4 via the elastic-connecting member 40 without an inadequate contact. If there is no problem with the connection, the output voltage VOUT of the booster circuit 52 is maintained constant as shown in FIG. 11. However, if the connection of the booster capacitor C1 is faulty, for example, the output voltage VOUT varies in synchronism with the booster clock as shown in FIG. 12. Ripples appear in the waveform of the output voltage when the connection is abnormal, and the peaks of the ripples are about the same values as the normal value shown in FIG. 11.

To check the state of the connection, the output voltage VOUT of the booster circuit 52 is monitored. The voltage VOUT is divided by the voltage monitoring circuit 210 by resistance division and input to one input terminal of the comparator 212. A reference voltage (1.5 V, for example) is applied to the other input terminal of the comparator 212. Here in the voltage-monitoring circuit 210, the output voltage VOUT is divided so that the output voltage VOUT of the booster circuit 52 is a little higher than the reference voltage when the output voltage VOUT is normal. Therefore, if the output voltage of the voltage-monitoring circuit 210 is higher than the reference voltage, the output of the comparator 212 is HIGH, indicating that the output voltage VOUT is normal. If one or more of the booster capacitors are out of connection, on the other hand, the waveform as shown in FIG. 12 is generated, whereby the output voltage of the comparator 212 is not always HIGH, but can go LOW.

Figure 13:
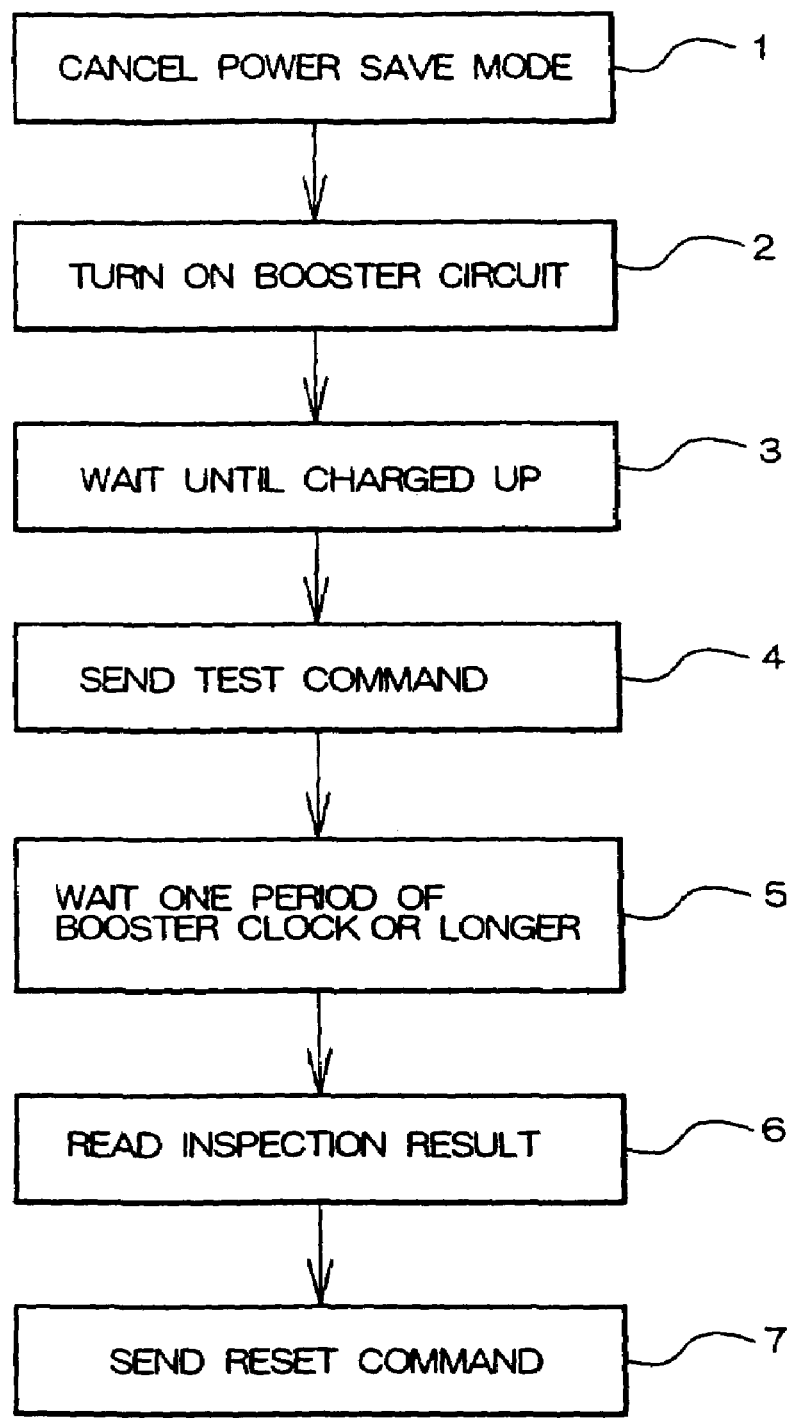
FIG. 13 is a flowchart of the voltage monitoring process.

The details of the voltage-monitoring process that checks whether the output voltage VOUT of the booster circuit 52 in the liquid crystal display driver IC 10 is normal are described by referring to the flowchart shown in FIG. 13.

First, the power save mode is canceled (Step 1 in FIG. 13), and the oscillation circuit 90 is driven in the normal mode. The booster circuit 52 is then turned on (Step 2 in FIG. 13), and a waiting time is allowed until the booster capacitor C4 is charged to voltage 4×VDD2 (Step 3 in FIG. 13).

After that, the MPU 300 sends the test command. This test command is also decoded by the command decoder 110 in the same manner as described above. As a result, signal TEST16 shown in FIG. 4 alone goes HIGH, and the other test signals TSINV, TEST1S, and TEST11 to TEST14 are all LOW.

Here, when the output voltage VOUT of the booster circuit 52 is normal, the output of the comparator 212 goes HIGH and consequently the output of the inverter INV2 shown in FIG. 4 is constantly LOW. One input of the NOR gate NOR1 following the inverter is therefore held LOW, and hence the output of the NOR gate NOR1 goes HIGH regardless of the logic of the other input.

On the other hand, because the signal TEST16 alone is brought to HIGH in the voltage-monitoring process as described above, the LOW output of the NAND gate NAND2 to which the output (HIGH) of the NOR gate NOR1 and the signal TEST16 (HIGH) are input is inverted by the NAND gate NAND7, NOR gate NOR5, and NAND gate NAND11, and the logic at the node "a" becomes HIGH.

Further, since the signal ITSINV is LOW, the non-inverting output path OUT1 is selected. The logic (HIGH) at the node "a" is therefore output as is as the output TSTOUT of the multiplexer 214 via the NAND gate NAND12 and NAND gate NAND13.

The output signal of the multiplexer 214 is also output via the MPU interface 100 to the serial clock signal CLK. This is performed during one period H of the boosting operation or longer time (Step 5 in FIG. 13).

The output of the multiplexer 214 is read by the MPU 300 (Step 6 in FIG. 13), and the output voltage VOUT of the booster circuit 52 is judged to be normal if the output logic of the multiplexer 214 is HIGH.

Next, the operation when connection of at least one of the external booster capacitors C1 to C4 is faulty will be described. When the connection of the booster capacitor C1 is faulty, for example, the output voltage VOUT of the booster circuit 52 varies as shown in FIG. 12. As clear from FIG. 12, the output voltage VOUT drops to considerably lower levels than the normal-time voltage level without fail during one period H of the booster clock in case of faulty connection.

Therefore, in Step 5 in FIG. 13, the voltage is monitored for at least one period H of the booster clock, and any abnormality in the output voltage VOUT can be latched by the fail status latch circuit 216 shown in FIG. 4.

When the output voltage VOUT varies as shown in FIG. 12, the output of the comparator 212 goes LOW from HIGH during one period H. Consequently HIGH is input to the clock input terminal C of the D-type flip-flop DFF via the inverter INV2 shown in FIG. 4, and voltage VDD (HIGH) of the data terminal D appears at the output Q of the D-type flip-flop DFF. Once the output Q goes HIGH, the input voltage to the clock input terminal C of the D-type flip-flop DFF goes LOW and the output Q is fixed HIGH, even if the output of the comparator 212 goes HIGH thereafter.

The logic of one input terminal of the NOR gate NOR1 following the D-type flip-flop is then fixed to HIGH by the Q output, and consequently the output of the NOR gate NOR1 goes LOW regardless of the logic of the inverter INV2.

In this manner, a fail status in which the output voltage VOUT is abnormal can be latched by the fail state latch circuit 216.

In this instance, the logic (LOW) at the node "a" shown in FIG. 4 is output as is as the output TSTOUT of the multiplexer 214 via the NAND gates NAND12 and NAND13. The MPU 300, to which this is input, can judge that the output voltage VOUT of the booster circuit 52 is abnormal when the logic is LOW by reading the output of the multiplexer 214 (Step 6 in FIG. 13) after the waiting time in Step 5 in FIG. 13. The MPU 300 then sends the reset command, and the voltage monitoring process terminates (Step 7 in FIG. 13).

Other use of ID of Liquid Crystal Display Driver IC

Since the liquid crystal display driver IC 10 of this embodiment has a particular ID, the MPU 300 can be configured so that it can be used with two or more types of liquid crystal display driver ICs. In this case, the MPU 300 has two or more sets of display control contents for two or more liquid crystal display driver ICs stored in a storage section, for example, PROM (Programmable Read Only Memory) in correspondence to a plurality of IDs.

As examples of liquid crystal display driver ICs used with the same MPU 300, the following types A and B used for driving liquid crystal panels of different display capacities can be given.

Type A: 65×96 dots liquid crystal panel drive IC
Type B: 48×96 dots liquid crystal panel drive IC When the display capacities of the liquid crystal panels differ, their liquid crystal display driver ICs are also different, and hence the sets of control contents in the MPU are different.

Further, when the manufacturers (vendors) of the liquid crystal panels are different, their control command systems are different unless they are compatible between the manufacturers, irrespective of the types of display capacities of the liquid crystal panels.

An ID that is set by the ID setting circuit 400 of the liquid crystal driver IC 10 can be used not only for the inspection process described above but also for selecting one set of control contents among those for a plurality of types of driver ICs stored in the storage section of the MPU 300 as described below.

For the procedure of selecting one set of control contents, the following can be cited as an example. The reading of the ID from the liquid crystal display driver IC 10 can be performed every time a device with this IC mounted therein is switched on or after every power-on reset. When the ID read command is sent from the MPU 300 in this timing, the ID from the liquid crystal display driver IC 10 is read by the MPU 300 in the same manner as in the ID monitoring process. In this case, the ID reading method is standardized among venders and types.

The ID read is stored in a register or memory, for example, RAM in the device. If the memory is nonvolatile, the ID that is read in the above-described inspection process at the factory can be stored. Thus, reading and storing of the ID every time the device is switched on or after every power-on reset becomes unnecessary.

Control contents, which correspond the ID stored in a memory, are then selected according to the stored ID, and the liquid crystal display driver IC 10 can be controlled using the control contents.

The control contents corresponding to the ID are selected and stored in the RAM by referring to a look-up table in the ROM according to the ID stored in the RAM, for example. The information in the control contents includes, for example, the screen size and display capacity of the liquid crystal panel and various commands (address set, display ON/OFF, etc.).

Here, when writing data to the display RAM 60 shown in FIG. 2 according to the control contents described above, data conforming to the display capacity of the liquid crystal panel can be written by repeatedly executing the operation to write display data in the area specified by the RAM address set command.

The present invention is not limited to the embodiments described above, and various modifications may be made within the sprits and scope of the present invention. For example, the present invention can also be applied to a configuration which allows the user to switch input of data such as command data and display data between serial and parallel, because the operation by the configuration of the present invention can be performed at least when serial input is used.

Further, the display driver IC of the present invention can be used not only for liquid crystal displays but also for other various types of displays. An electronic device of the present invention is also not limited to a cellular phone, and can be applied to other various electronic devices of which the liquid crystal or the other type of display unit is driven according to the data input serially.

What is claimed is:

1. A display unit, comprising:
   a display section;
   a display driver IC among a plurality of types of display driver ICs capable of driving and controlling the display section; and
   an MPU sending a command and display data to the display driver IC,
   the display driver IC including:
   an ID setting circuit; and
   a command decoder decoding the command from the MPU,
   the MPU having a storage section for storing a plurality of types of control contents for a plurality of types of display driver ICs including the display driver IC,
   the MPU sending an ID monitor command to the display driver IC when the MPU reads an ID from the ID setting circuit,
   the display driver IC sending ID information from the ID setting circuit to the MPU in accordance with a signal generated by the command decoder decoding the ID monitor command, and
   the MPU reading the ID information so as to control the display driver IC among a plurality of types of display driver ICs according to the corresponding control contents in the storage section among the plurality of types of control contents for a plurality of types of display driver ICs including the display driver IC.

2. The display unit according to claim 1, the MPU including an ID storage section which stores the ID from the ID setting circuit.

3. The display unit according to claim 2, the MPU sending the ID monitor command to the display driver IC every time the display unit is switched on, the MPU storing in the ID storage section the ID from the ID setting circuit in the display driver IC.

4. The display unit according to claim 2, the MPU sending the ID monitor command to the display driver IC after every power-on reset, the MPU storing in the ID storage section the ID from the ID setting circuit in the display driver IC.

5. An electronic device including the display unit as defined in claim 1.

\* \* \* \* \*